United States Patent Office 3,004,919
Patented Oct. 17, 1961

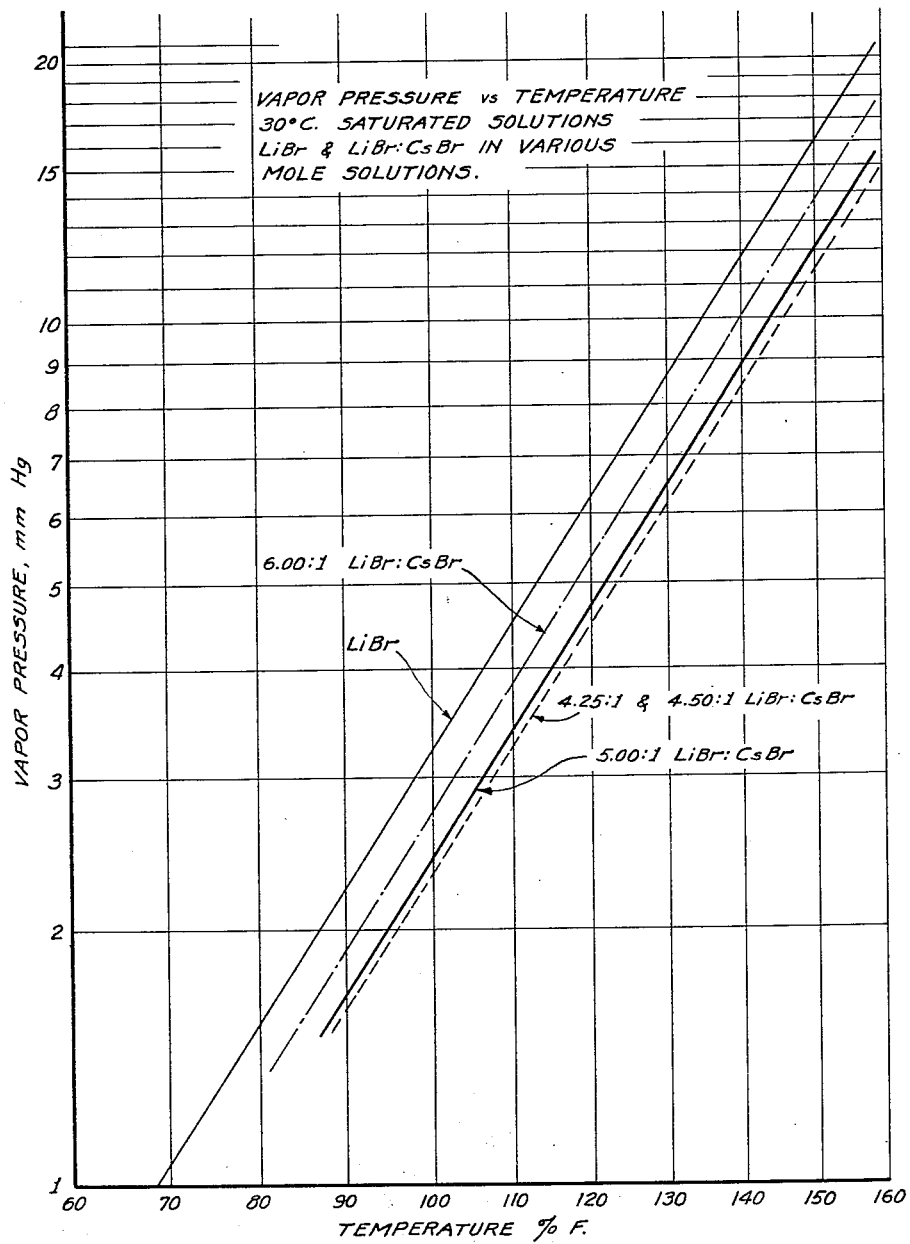

3,004,919
ABSORBENT COMPOSITION FOR AN ABSORBENT REFRIGERATION SYSTEM
William F. Rush, Arlington Heights, and William G. Watters, Skokie, Ill., assignors to Borg-Warner Corporation, Chicago, Ill., a corporation of Illinois
Filed Aug. 27, 1959, Ser. No. 836,421
2 Claims. (Cl. 252—67)

This invention relates to refrigeration in accordance with the absorption refrigeration principle and more particularly to an absorbent possessing improved characteristics over known working fluids for use with an air cooled absorption refrigeration system.

Generally speaking, the absorption cycle uses two fluid streams in a totally enclosed system. One of these fluid streams is the refrigerant, which provides the cooling effect; the other is the absorbent, which conveys the refrigerant through part of the cycle. The major components of the system are a generator, condenser, evaporator, absorber, and heat exchanger. The refrigerant passes through all units; the absorbent is confined to movement through the generator, heat exchanger, and absorber. In this cycle no mechanical compressor is needed.

In operation, a mixture of absorbent and refrigerant is heated in the generator to boil off some of the refrigerant, which rises as vapor to the condenser. The generator and condenser operate at relatively high pressure, so the condensing temperature of the refrigerant is sufficiently high to permit rejecting the latent heat to the ambient air or cooling water. The liquid refrigerant is throttled to lower pressure so it will boil at relatively low temperature in the evaporator and thus absorb heat from the air to be cooled. The vaporized refrigerant passes to the absorber, where it dissolves in cool absorbent solution which has come to the absorber from the generator outlet. The cool solution, now rich in refrigerant, is pumped back to the generator to continue the process.

In the past, a lithium bromide-water combination refrigerant-absorbent has been utilized in systems of the type described above. However, in attempting to adapt this combination to an air cooled operation a number of problems were presented. First, the limiting operating temperature for a lithium bromide-water solution in a water cooled system with an evaporator temperature of 40 degrees F. is approximately 120 degrees F. For air cooled operation the solution temperature in the absorbent would have to be raised to approximately 140 degrees F. This would require a higher concentration of lithium bromide in order to maintain the boiling of the refrigerant water in the evaporator at 40 degrees F. Solubility limitation prevents further dissolution of lithium bromide and water and causes the salt to crystallize thereby resulting in a "freeze up" of the system.

Taking these factors into consideration, applicants set out to find a refrigerant-absorbent combination which would not be subjected to the "freezing" limitation of lithium bromide and water under the conditions as set forth above attributable to an air cooled system.

Because of its many advantages it was decided by applicants to utilize water as a refrigerant in their search to fiind an improved absorbent. However, it is to be understood that although this description for illustrative purposes uses water as refrigerant, it is not meant that the absorbent, which is the subject matter of the present invention, must be used in conjunction with a water refrigerant, unless expressly claimed.

Many materials were selected for study in order to develop a composition which would be an improvement over absorbents used in the past in absorption refrigeration systems. After a lengthy process of elimination and experimentation applicants discovered that the addition of cesium bromide to a lithium bromide solution in various mole ratios would effect the desirable results referred to herein.

It is therefore an object of the present invention to provide a substantially better working fluid for use with an air cooled absorption refrigeration system than that which has been proposed in the past.

A further object of this invention is to provide a refrigerant-absorbent solution for use with an air cooled absorption refrigeration system which would not undergo a crystallization at the temperatures and pressures occasioned in an air cooled system.

Still another, and more specific object of this invention is to provide a salt which when added to a lithium bromide solution affords a sufficient vapor pressure depression to operate an air cooled absorption-refrigeration system.

A specific object is the provision of a working fluid containing water as a refrigerant and a lithium bromide-cesium bromide mixture as an absorbent.

Another object is to afford a salt possessing the following characteristics for use as an absorbent:

(1) Be of high solubility so that the vapor pressure of the solution is significantly less than for ideal solutions.
(2) Yield solutions with low heat capacity and viscosity.
(3) Be non-corrosive.
(4) Be able to yield a solution with as small a heat of dilution as compatible with other properties.
(5) Be non-toxic.
(6) Be economically feasible for use with an absorption refrigeration system.

Other objects of the invention will, in part, be obvious and in part appear hereafter.

The most important criterion in choosing a salt for use in a water-salt system of the type discussed herein was its solubility, since it is apparent that the more of a given salt in solution the lower will be the vapor pressure of the solution.

The investigation for a possible absorbent which would possess favorable vapor pressure depressant qualities for an air cooled absorption system was initiated by screening a large number of candidate materials. The various salt combinations tested were determined on the basis of their relative high individual salt solubility position of a like or common ion and in deviation from ideal solution behavior.

*Example*

The titer method was used in determining the solubility of various candidate salts. This method consists in determining the crystallization temperature of a salt solution of known concentration. Solutions of known concentration and of relatively high concentrations were gradually diluted and the crystallization temperature of each dilution measured. The rate of cooling was minimized wherever possible and thus super-cooling was avoided. Several readings were taken at each crystallization point.

A 10–15 gram sample of each candidate salt was generally employed. The weight of the sample was measured to the nearest 0.01 gram or to four significant figures. A 10 milliliter microburette was used to measure the dilutions with an estimated accuracy of 0.01 ml. The crystallization temperatures were read on a 0–100 degree C. Cenco precision grade mercury thermometer which was graduated in 0.2° C.

Vapor pressure measurement was made employing an absolute or direct method. This method utilizes a closed-end U-tube mercury manometer. Use of triple distilled mercury and further degassing by boiling under vacuum minimized error and rendered it less significant than the error imposed by the limits of accuracy of a cathetometer.

In each test the salt solution was charged to the apparatus by means of a capillary funnel. The test solution was then frozen with a Dry-Ice acetone mixture and the pressure reduced to 25 microns. With no vacuum supplied the solution was thawed. During this step the dissolved gas passed into the evacuated space above the test solution. The test solution was refrozen and the system sealed under a vacuum (below 25 microns). The entire apparatus was transferred to a constant temperature bath and direct vapor pressure measurements were made at a series of temperatures between 30 degrees and 70 degrees C. Because of the favorable qualities shown by lithium bromide and cesium bromide, applicants experimented further with this binary salt mixture in various mole ratios and discovered that the mixture provided an excellent workable absorbent for use with an absorption refrigeration system.

Following are listed in table form the results achieved with 30 degrees C. saturated water solutions of binary salt mixtures of lithium bromide and cesium bromide:

| Result No. | Mole Ratio, LiBr/CsBr | Concentration | | Vapor Pressure at 140 Degrees F. mm. Hg. @ 0 Degrees C. |
|---|---|---|---|---|
| | | g./100 g. $H_2O$ | Wt. Percent | |
| 1 | 4.25/1 | 295 | 74.7 | 8.6 |
| 2 | 4.50/1 | 297 | 74.8 | 8.6 |
| 3 | 5.00/1 | 283 | 73.8 | 8.7 |
| 4 | 6.00/1 | 262 | 72.4 | 10.2 |

The figures as set out above were achieved with pure reagents. The results are shown graphically in the figure.

Lithium bromide, which has been used in the past as an absorbent solution, absent the various quantities of cesium bromide proposed herein by applicants, at a 30 degrees C. saturated solution would yield a vapor pressure of 11.9 mm. (Hg at 0 degrees C.) at 140 degrees F. This result is also shown graphically in FIGURE 1. The preferred absorbent solution system of the type discussed herein comprises a 4.50/1 mole ratio of lithium bromide to cesium bromide (Results Number 2).

It thus can be seen in view of the remarks set forth herein, that the lower vapor pressure achieved by the addition of cesium bromide to a lithium bromide solution in the various mole ratios claimed affords a definite advantage over the singular salt system used in the past and thereby provides an absorbent-refrigerant combination which possesses the qualities necessary for use in an air cooled absorption refrigeration system.

While we have described our invention in connection with one specific embodiment thereof, it is to be understood that this is by way of illustration and not by way of limitation and the scope of our invention is defined solely by the appended claims which should be construed as broadly as the prior art will permit.

We claim:
1. An absorbent composition for an absorption refrigeration system consisting of a mixture of lithium bromide and cesium bromide in water, said lithium bromide present in a mole ratio of 4.25–6.00 lithium bromide to 1 mole cesium bromide.

2. An absorbent composition for an absorption refrigeration system consisting of a mixture of lithium bromide and cesium bromide in water, said lithium bromide present in a mole ratio of 4.50 to 1 cesium bromide.

References Cited in the file of this patent

Buffington: Refrig. Eng. 57: 343–5, 384, 386, 388, April 1949.

Whitlow et al.: Refrig. Eng. 59: 38–43, 100, 102, January 1951.